United States Patent
Flickinger et al.

(10) Patent No.: US 7,152,237 B2
(45) Date of Patent: Dec. 19, 2006

(54) DELIVERING TARGETED ADVERTISEMENTS TO THE SET-TOP-BOX

(75) Inventors: Gregory C. Flickinger, Furlong, PA (US); Charles A. Eldering, Doylestown, PA (US)

(73) Assignee: Prime Research Alliance E., Inc., Tortola (VG)

( * ) Notice: Subject to any disclaimer, the term of this patent is extended or adjusted under 35 U.S.C. 154(b) by 20 days.

(21) Appl. No.: 11/190,248

(22) Filed: Jul. 27, 2005

(65) Prior Publication Data
US 2005/0278743 A1 Dec. 15, 2005

Related U.S. Application Data

(63) Continuation of application No. 09/748,943, filed on Dec. 27, 2000, now abandoned.

(60) Provisional application No. 60/229,156, filed on Aug. 31, 2000.

(51) Int. Cl.
H04N 7/10 (2006.01)
H04N 5/445 (2006.01)
H04N 7/16 (2006.01)

(52) U.S. Cl. .................. 725/42; 725/35; 725/54; 725/145; 725/151

(58) Field of Classification Search ............. 725/35, 725/39–46, 54, 55, 85, 139–142, 145, 151
See application file for complete search history.

(56) References Cited

U.S. PATENT DOCUMENTS

| | | | |
|---|---|---|---|
| 4,602,279 A | 7/1986 | Freeman | |
| 5,029,014 A | 7/1991 | Lindstrom | |
| 5,099,319 A | 3/1992 | Esch et al. | |
| 5,155,591 A | 10/1992 | Wachob | |
| 5,231,494 A | 7/1993 | Wachob | |
| 5,271,626 A | 12/1993 | Llenas et al. | |
| 5,424,770 A | 6/1995 | Schmelzer et al. | |
| 5,446,919 A | 8/1995 | Wilkins | |
| 5,515,098 A | 5/1996 | Carles | |
| 5,534,911 A | 7/1996 | Levitan | |
| 5,592,551 A | 1/1997 | Lett et al. | |
| 5,600,364 A | 2/1997 | Hendricks et al. | |
| 5,600,366 A | 2/1997 | Schulman | |
| 5,604,542 A | 2/1997 | Dedrick | |

(Continued)

FOREIGN PATENT DOCUMENTS

CA 2264392 1/1999

(Continued)

OTHER PUBLICATIONS

AdLink Engineering, Ad Insertion Wiring Diagrams, 1999, 17 Pgs.

(Continued)

*Primary Examiner*—Kieu-Oanh Bui
(74) *Attorney, Agent, or Firm*—Technology, Patents & Licensing, Inc.

(57) ABSTRACT

A system and a method for delivering targeted advertisements to the set-top box (STB). The targeted advertisements may be delivered to the STB in a low bandwidth channel or in a high bandwidth channel as an ad channel. The ad channel may be an analog channel wherein the advertisements are transmitted as analog video. Alternatively, the advertisement channel may be a digital channel, and the advertisements may be encoded and transported in the same way as conventional programming. In digital cases, a 6 MHz digital channel may carry several digital advertisement channels. Moreover, other services (e.g., data may be carried within the 6 MHz digital channel). Alternatively, the ad channel may share a 6 MHz bandwidth with one or more other programming channels.

20 Claims, 4 Drawing Sheets

U.S. PATENT DOCUMENTS

| | | | |
|---|---|---|---|
| 5,621,728 A | 4/1997 | Lightfoot et al. | |
| 5,636,346 A | 6/1997 | Saxe | |
| 5,650,994 A | 7/1997 | Daley | |
| 5,661,516 A | 8/1997 | Carles | |
| 5,687,095 A | 11/1997 | Haskell et al. | |
| 5,708,664 A | 1/1998 | Budge | |
| 5,724,091 A | 3/1998 | Freeman et al. | |
| 5,740,549 A | 4/1998 | Reilly et al. | |
| 5,752,160 A | 5/1998 | Dunn | |
| 5,761,601 A | 6/1998 | Nemirofsky et al. | |
| 5,774,170 A | 6/1998 | Hite et al. | |
| 5,801,747 A | 9/1998 | Bedard | |
| 5,801,753 A | 9/1998 | Eyer et al. | |
| 5,812,790 A | 9/1998 | Randall | |
| 5,848,352 A | 12/1998 | Dougherty et al. | |
| 5,861,919 A | 1/1999 | Perkins et al. | |
| 5,862,140 A | 1/1999 | Shen et al. | |
| 5,877,812 A | 3/1999 | Krause et al. | |
| 5,886,731 A | 3/1999 | Ebisawa | |
| 5,912,696 A | 6/1999 | Buehl | |
| 5,926,205 A | 7/1999 | Krause et al. | |
| 5,931,901 A | 8/1999 | Wolfe et al. | |
| 5,956,088 A | 9/1999 | Shen et al. | |
| 5,966,120 A * | 10/1999 | Arazi et al. | 715/724 |
| 5,969,715 A | 10/1999 | Dougherty et al. | |
| 5,978,381 A | 11/1999 | Perlman | |
| 5,990,927 A | 11/1999 | Hendricks et al. | |
| 6,002,394 A | 12/1999 | Schein et al. | |
| 6,009,409 A | 12/1999 | Adler et al. | |
| 6,009,410 A | 12/1999 | LeMole et al. | |
| 6,020,880 A | 2/2000 | Naimpally | |
| 6,020,883 A | 2/2000 | Herz et al. | |
| 6,026,369 A | 2/2000 | Capek | |
| 6,029,045 A | 2/2000 | Picco et al. | |
| 6,038,256 A | 3/2000 | Linzer et al. | |
| 6,088,722 A | 7/2000 | Herz et al. | |
| 6,141,358 A | 10/2000 | Hurst, Jr. et al. | |
| 6,144,653 A | 11/2000 | Persson et al. | |
| 6,160,989 A | 12/2000 | Hendricks et al. | |
| 6,208,688 B1 | 3/2001 | Seo et al. | |
| 6,240,103 B1 | 5/2001 | Schoenblum et al. | |
| 6,253,238 B1 | 6/2001 | Lauder et al. | |
| 6,263,501 B1 | 7/2001 | Schein et al. | |
| 6,370,199 B1 | 4/2002 | Bock et al. | |
| 6,418,122 B1 | 7/2002 | Schoenblum et al. | |
| 6,425,131 B1 | 7/2002 | Crandall et al. | |
| 6,434,747 B1 | 8/2002 | Khoo et al. | |
| 6,446,082 B1 | 9/2002 | Arita | |
| 6,446,261 B1 | 9/2002 | Rosser | |
| 6,459,427 B1 | 10/2002 | Mao et al. | |
| 6,463,585 B1 | 10/2002 | Hendricks et al. | |
| 6,487,721 B1 | 11/2002 | Safadi | |
| 6,516,002 B1 | 2/2003 | Huang et al. | |
| 6,611,624 B1 | 8/2003 | Zhang et al. | |
| 6,615,039 B1 * | 9/2003 | Eldering | 455/418 |
| 6,631,523 B1 | 10/2003 | Matthews, III et al. | |
| 6,665,872 B1 | 12/2003 | Krishnamurthy et al. | |
| 6,675,385 B1 | 1/2004 | Wang | |
| 6,698,020 B1 | 2/2004 | Zigmond et al. | |
| 6,704,930 B1 * | 3/2004 | Eldering et al. | 725/36 |
| 6,718,551 B1 | 4/2004 | Swix et al. | |
| 6,724,974 B1 | 4/2004 | Naruto et al. | |
| 6,738,978 B1 | 5/2004 | Hendricks et al. | |
| 6,796,555 B1 | 9/2004 | Blahut | |
| 2002/0026645 A1 | 2/2002 | Son et al. | |
| 2002/0038455 A1 | 3/2002 | Srinivasan et al. | |
| 2002/0104083 A1 | 8/2002 | Hendricks et al. | |
| 2002/0129374 A1 | 9/2002 | Freeman et al. | |
| 2002/0152471 A1 | 10/2002 | De Haas | |
| 2003/0088872 A1 | 5/2003 | Maissel et al. | |
| 2003/0200128 A1 | 10/2003 | Doherty | |

FOREIGN PATENT DOCUMENTS

| | | |
|---|---|---|
| WO | WO9712486 | 4/1997 |
| WO | WO9717774 | 5/1997 |
| WO | WO9827723 | 6/1998 |
| WO | WO9856128 | 12/1998 |
| WO | WO9911065 | 3/1999 |
| WO | WO9952285 | 10/1999 |
| WO | WO9966719 | 12/1999 |
| WO | WO0014951 | 6/2000 |
| WO | WO0033224 | 6/2000 |
| WO | WO0054504 | 9/2000 |
| WO | WO0147279 | 6/2001 |
| WO | WO0233973 | 4/2002 |
| WO | WO0233975 | 4/2002 |

OTHER PUBLICATIONS

NCTA Technical Papers, "Compressed Digital Commercial Insertion: New Technology Architectures for the Cable Advertising Business", 1992, 8 pgs.

* cited by examiner

DELIVERING TARGETED ADVERTISEMENTS TO THE SET-TOP-BOX

CROSS REFERENCE TO RELATED APPLICATIONS

This application is a continuation of U.S. patent application Ser. No. 09/748,943, filed Dec. 27, 2000, now abandoned and entitled "Delivering Targeted Advertisements To The Set-Top-Box", which claims the benefit of provisional application No. 60/229,156 filed on Aug. 31, 2000 entitled "Method and System for Addressable and Program Independent Advertising", the entire disclosures of which are incorporated herein by reference.

BACKGROUND OF THE INVENTION

Traditional broadcast television systems broadcast the same television signal to each person viewing a particular station. Thus, each person viewing a particular channel will necessarily view the same programming content as well as the same advertisements embedded in the programming content. For most broadcast medium industries, such as television, advertising revenues may be the sole source of revenues for the television broadcaster. In a conventional television broadcast system, many advertisers compete for the opportunity to place their advertisement in the advertisement breaks between the programming content. In addition, once a particular advertising break has been filled with an advertisement, the television broadcaster can no longer sell that space in the broadcast stream. Because the advertisements on a particular channel are seen by every viewer tuned to the particular channel in a conventional television system, the advertisements in a conventional television broadcast system cannot be targeted to a particular portion of the audience or even to a particular individual. Therefore, the television broadcast operator may only derive a limited predetermined amount of advertising revenue from any particular advertisement spot and it is desirable to provide the broadcaster with a system for increasing the advertisement revenues that may be generated.

The problem with advertisements on a conventional television broadcasting system for the advertiser is that each advertiser is interested in reaching only one or more subsets of the total viewing audience, because not all members of the viewing audience may be desirable candidates for receiving a particular advertisement. For example, an advertisement about a product for male hair growth would typically be directed to males because males are more likely to purchase the product. The proportion of the audience which is thought to be genuinely interested in the advertisement (or believed by the advertiser to be a prime candidate to purchase their product) varies by product category, but normally ranges from 20–40%. Therefore, the advertisement viewed by the other 60–80% of the audience, which are not prime candidates, represents a large amount of wasted spending by the advertiser. Therefore, it is desirable to provide a system which permits an advertiser to more carefully direct advertisements to a particular set of people or even to an individual person so that the advertiser does not waste large sums of money on parts of the audience which do not have any interest in their product. Thus, both television broadcasters and advertisers desire a better way in which to provide advertisements to the audience in a more targeted manner.

The emerging digital television media, in various forms such as digital cable, direct broadcast satellite and wireless cable, provide opportunities for advertisers to better target their advertising messages and provide more opportunities for broadcasters to generate more advertising revenues for a number of reasons. With digital television media, the total viewing audience may be divided into many subgroups based on common interests or common demographic descriptors. Advertising targeting is also possible with digital television media due to an expansion in the bandwidth capacity of the broadcast from 8–100 channels in typical analog television to 200 or more channels in digital. In addition, targeting of the advertisement is further enabled by the capability of a digital set-top box to capture individual household data about viewing preferences and the like.

There is a need for a method, apparatus and system to utilize the additional bandwidth and the storage capability of the STB to better target ads to groups, families and/or individual subscribers. Moreover, there is a need for individual household data about viewing preferences and the like to be captured, stored, uploaded to the broadcaster and used to further improve the targeting of the advertising messages. To more directly target advertisements to a particular portion of the total audience, the audience may be broken down into subgroups, in real-time, based on one or more factors or a combination of the factors. These factors may include shared demographics, such as gender, age or household income levels, shared preferences and tendencies to purchase certain product categories, such as foreign versus domestic automobiles, vacation travel, and many other factors.

SUMMARY OF THE INVENTION

The present invention is directed at a system and a method for delivering targeted advertisements to the set-top boxes (STBs). The targeted advertisements may be delivered to the STB in a low bandwidth channel or in a high bandwidth channel. These advertisement (ad) channels could be dedicated solely to ad delivery or could be shared. The channel may comprise 6 MHz bandwidth and may carry nothing but ads.

The ad channel may be an analog channel wherein the ads are transmitted as analog video. Alternatively, the ad channel may be a digital channel, and the ads may be encoded and transported in the same way as conventional programming. In digital cases, a 6 MHz digital channel may carry several digital ad channels. Moreover, other services (e.g., data) may be carried within the 6 MHz digital channel. Alternatively, the ad channel may share a 6 MHz bandwidth with one or more other programming channels.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE INVENTION

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 4 in particular, the apparatus of the present invention is disclosed.

Figure 1:
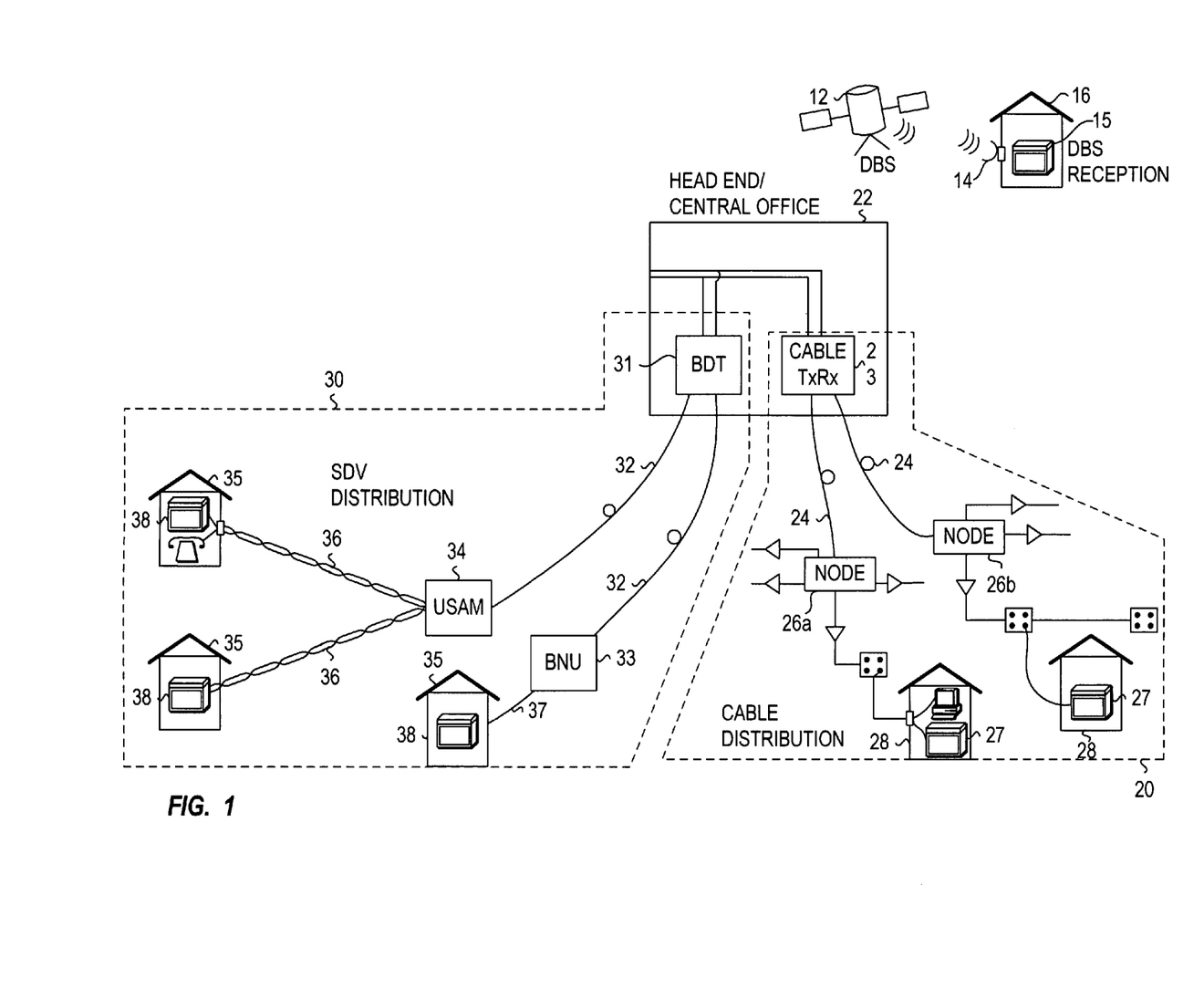
FIG. 1 is a block diagram of an exemplary television service communication network.

FIG. 1 generally illustrates three of the most common types of digital television service delivery networks with which the present invention can be suitably used. These include (1) very high speed digital subscriber line (VDSL), (2) digital cable and (3) digital broadcast satellite (DBS). In a DBS system, a programming stream comprising upwards of one hundred channels of television programming is delivered directly from a geo-stationary satellite transmitter 12 orbiting the earth to a receiving antenna 14 mounted on or near each subscriber's house 16 and from the antenna 14 via a cable to a satellite receiving station 15 in the subscriber's house 16. The satellite receiving station 15 (which is a form of set-top box (STB)) selects a channel and demodulates the signal for delivery to a monitor (e.g., a television, not shown). Most DBS systems are arranged such that data also can be sent in the upstream direction, that is, from the STB 15 to the DBS provider. In most DBS systems, the STB 15 also is coupled to the telephone line and is designed and programmed to place telephone calls to the DBS service provider to periodically send information in the upstream direction. Such information commonly may comprise requests for Pay-Per-View (PPV) programs and requests for changes in the subscription (a request that one or more of premium channels be added to the service, etc.). The return path can also be over a moderate to high bandwidth digital subscriber line (DSL).

In a typical digital cable network 20, multiple channels of television information are transmitted from a head end or central office 22 via a cable network 23. Particularly, the channels are transmitted via cables 24 to nodes 26(a–b). The nodes 26 are essentially switching/routing stations which service multiple homes (usually a few hundred). The nodes 26 route the signals, over coaxial cable, to individual subscribers 28. The individual subscriber 28 will have STBs 27 that select a particular channel from the transmit stream, demodulate it and forward it for display on one or more monitors or televisions (not shown). Different data streams can be sent to the different nodes 26 of the network such that households coupled to node 26a can receive different programming than households coupled to node 26b. Thus, such systems are "addressable" by node, but not by individual subscriber. Upstream information may be sent from the STB 27 to the central office 22 via a dedicated upstream channel over the cable 24. In cable systems that do not support two-way communication, the upstream "channel" can be through the telephone as described above in connection with DBS systems.

In accordance with a third common type of system, namely, switched digital video (SDV) 30, television programming is ultimately delivered to the home over existing telephone wire. Particularly, television signals are transmitted from a Broadband Digital Terminal (BDT) 31 in the central office 22 via wire, typically fiber optic cable 32, to a universal service access multiplexer (USAM) 34 or a Broadband Network Unit (BNU) 33. The USAM 34 or the BNU 33 then deliver the data to multiple individual subscriber households 35 via regular telephone twisted wire pair 36 or coaxial cable 37 respectively, using VDSL protocols and equipment. The USAM 34 or the BNU 33 receive a digital signal comprising one or more television channels. However, because of the bandwidth limitations of twisted wire pair 36, typically only 3–5 television programs at a time can be delivered from the USAM 34 to the subscriber household 35. Accordingly, the subscriber has a STB 38 that is similar in functionality to the STB of a digital cable system 20 or DBS system 12, except that when the subscriber changes channels such as by operating a remote control, the remote channel change signal is received by the STB 38 and transmitted upstream to the central office 22 which switches the channel for the subscriber and begins sending the newly selected channel to the household 35. SDV systems 30 are essentially fully modern asynchronous two-way communication networks. Accordingly, the STB 38 can transmit information upstream over the same path used for the downstream signals. SDV systems 30 typically operate using an asynchronous transfer mode (ATM) protocol which is well-known in the networking arts.

Figure 2:
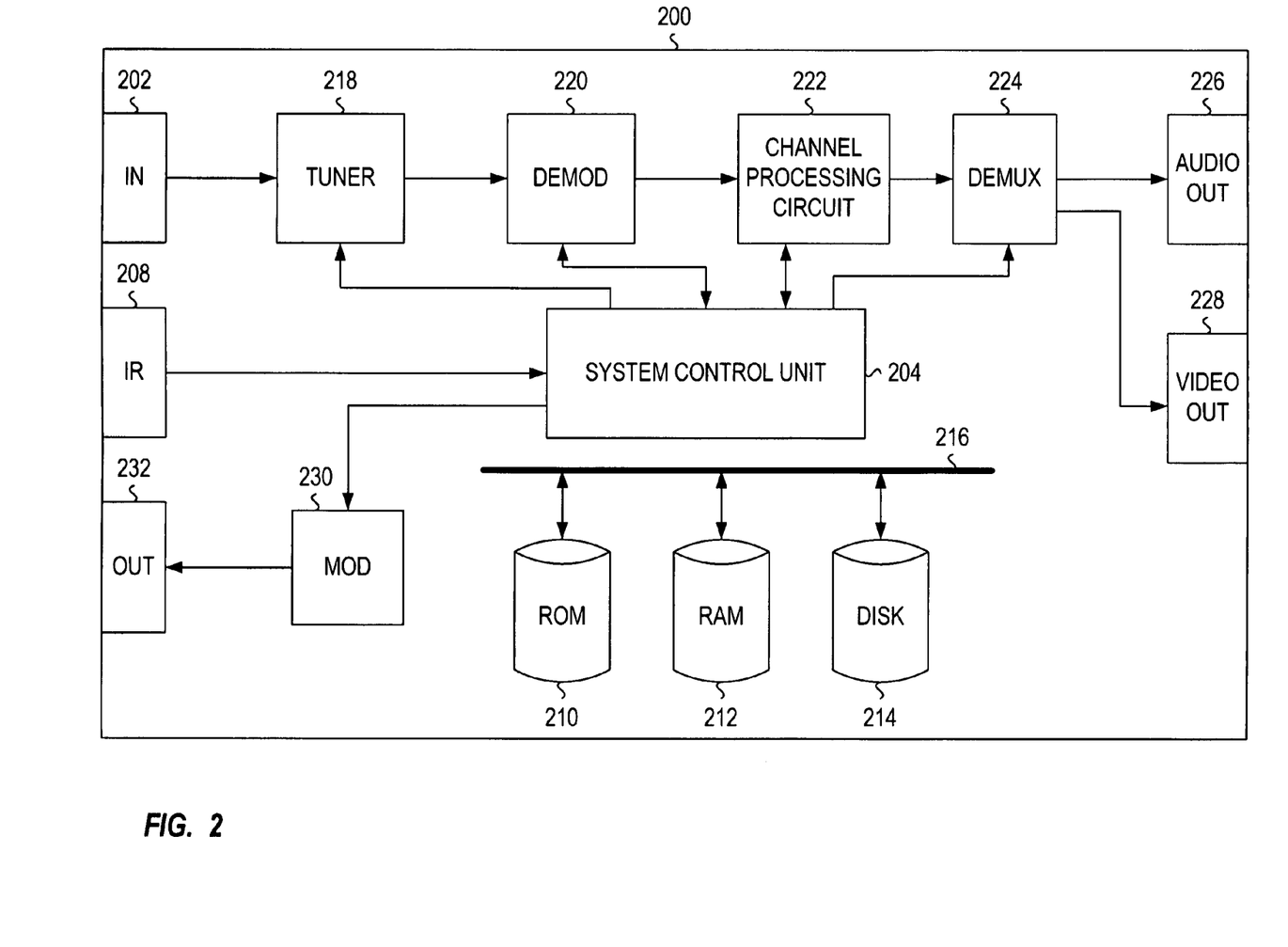
FIG. 2 is a block diagram of an exemplary set-top box of FIG. 1.

FIG. 2 is a block diagram showing the basic components of a STB 200 within which the present invention may be incorporated, whether it is for DBS, SDV, digital cable or any other system. The STB 200 includes an input port 202 for coupling to the input signal, e.g., a coaxial cable in the case of analog or digital cable TV, a telephone line in the case of SDV or an input cable from an antenna in the case of DBS. The television input signal may be analog or digital. Alternatively, the signal may be a video stream or multimedia stream such as a motion picture expert group (MPEG) signal from any communications network, such as the Internet. The STB 200 includes a system control unit (SCU) 204 which controls operation of the components of the STB 200. The system control unit 204 essentially is a central processing unit (CPU) and may be any digital processing device, such as a microprocessor, finite state machine (FSM), digital signal processor (DSP), application specific integrated circuit (ASIC), general purpose computer, etc. The system control unit 204 receives commands from the subscriber, such as through infrared (IR) reception of commands from a handheld remote control unit (not shown) through an IR receiving circuit 208. The SCU decodes the commands and forwards control signals to other circuits in the STB 200 in order to carry out the subscriber's commands, such as changing the channel. The STB 200 further includes a read only memory (ROM) 210 containing software and fixed data used for operating the STB 200, and a random access memory (RAM) 212 for storing changeable data. Preferably, the STB 200 also includes a separate internal or external large memory device, such as a hard disk drive 214 or optical disk drive for storing the very large amounts of data that comprise digital multimedia data, e.g., television programs and advertisements. The SCU 204, RAM 212, ROM 210 and hard disk 214 are coupled to a master bus 216 over which the units can communicate with each other.

The input signal from input port 202 is passed through a tuning circuit 218. Under control of the system control unit 204, the tuning circuit 218 selectively parses out the data corresponding to the particular channel selected by the viewer. That data is passed to a demodulator 220 that demodulates the data. A channel processing circuit 222 takes the demodulated channel data and processes it as needed. The necessary channel processing may comprise almost nothing to significant processing of the data depending on the particular form of the input data and the features of the STB 200 which would be familiar to persons of skill in the related arts. Exemplary functions that might be performed in the channel processing circuitry include decoding an encoded data stream (e.g., MPEG, Dolby Surround-Sound™) or inserting advertisements into the data stream in accordance with the present invention.

If received data is to be stored locally at the STB 200, the channel processing circuit can pass the data to one of the memory devices 212 or 214 through the system control unit 204.

The output of the channel processing circuit 222 typically is coupled to a demultiplexer 224 which separates the audio and video portions of the channel and forwards them to audio and video output ports 226 and 228, respectively.

Tuner 218 and channel processing circuit 222 may be controlled by the system control unit 204. However, the demodulator 220 and demultiplexer 224 may also need control.

Many STBs 200 also can transmit data upstream to the head end. Such STBs 200 would include a modulator 230 coupled to the system control unit 204 for modulating data generated in the system control unit 204 for transmission to the head end as well as an output port 232 for coupling a cable or other link to the head end. It will be understood by those of ordinary skill in the art that the input port 202 and output port 232 might comprise the same physical port.

A STB 200 for an SDV network typically would not include the tuner 218 since, as indicated above, since channel selection is not processed in the STB 200 but is merely transmitted to the USAM 34 for processing.

It also will be apparent to those of ordinary skill in the related arts that FIG. 2 is a very high level depiction of the most basic components of an STB 200 and that other forms are possible.

The present invention utilizes targeted advertising wherein advertisements are matched to groups of subscribers (e.g., nodes in a cable television environment or to individual subscribers in switched digital video or streaming video environments). The actual formation of groups for targeted advertising is accomplished by creating multiple lists or tables (subgroups) of subscribers that share one or more subscriber characteristics. The subgroups may be based (1) geographic segmentation, (2) demographic segmentation, (3) psychological segmentation, (4) psychographic segmentation, (5) sociocultural segmentation, (6) use-related segmentation, (7) use-situation segmentation, (8) benefit segmentation, and (9) hybrid segmentation. More information may be found in a book entitled *Consumer Behavior*, by Leon G. Schiffman and Leslie Lazar Kanuk published by Prentice Hall, New Jersey 1999.

The analysis of different segmentations permit the advertisement to be directed to specific users or groups of users who fit certain criteria. For instance, an advertisement for a baby stroller could reach parents of children under five years old—and only those individuals in that group. The other publicly or privately available data regarding the subscribers may also be collected. This data may also be mined to form a subgroup of subscribers which has a common characteristic which matches the characteristics of the target group.

One technique for forming groups involves utilization of geographic location information. Each group may consist of subscribers located in a particular state, city, or associated with a cable television node. Another technique for forming groups is based on knowledge of the viewership of the actual programming. For example, many companies collect data related to the viewing of the television programming and such information may be used to form subgroups. Once such collection of data, known as Nielsen ratings, are based on samples of information related to the viewing of television programming. Other types of similar information are also available. The groups may be based on the actual viewership information, on an estimate of the current viewership, or on the statistical measurement of the viewership.

Once the targeted advertisements have been identified, the targeted advertisements may be delivered to the set-top in a low bandwidth channel or in a high-speed channel. These channels could be dedicated to ad delivery or could be shared, providing delivery channels for other services. The low bandwidth method of delivery would require that the ads be delivered (or begin being delivered) significantly in advance of ad presentation. Ads delivered via a high bandwidth channel could be delivered at or just prior to the time of presentation.

An example of such a dedicated channel may a broadcast high bandwidth ad channel. A service provider (i.e., DBS, cable, SDV, Multichannel Multipoint Distribution System (MMDS), and Local MDS (LMDS)) allocates and dedicates one or more "channels" of the system to be used for delivering advertisements. This channel, used for transporting ads, would be a high bandwidth (e.g., 6 MHz) channel, and would, in one embodiment, carry nothing but ads. In one embodiment, the operator would determine which ads were sent, but essentially ads would be continually sent to the STB, the STB being able to store, for subsequent display. The appropriate ads carried on this channel would be encoded and transported in the same way that the other programming content (on other channels) was encoded and transported. That is, if one were to "tune" to the ad channel, one would receive only conventional advertisements (normal video and audio).

In the case of analog video, the ads would be transmitted just as analog video is transmitted over the network. In the case of digital video, the ad would be encoded and transported in the same way as conventional programming. A 6 MHz channel could carry several digital ad channels just as several digital video channels are carried within one 6 MHz channel. Moreover, other services (e.g. data) could be carried in the ad channel with the ads if desired.

Figure 3:
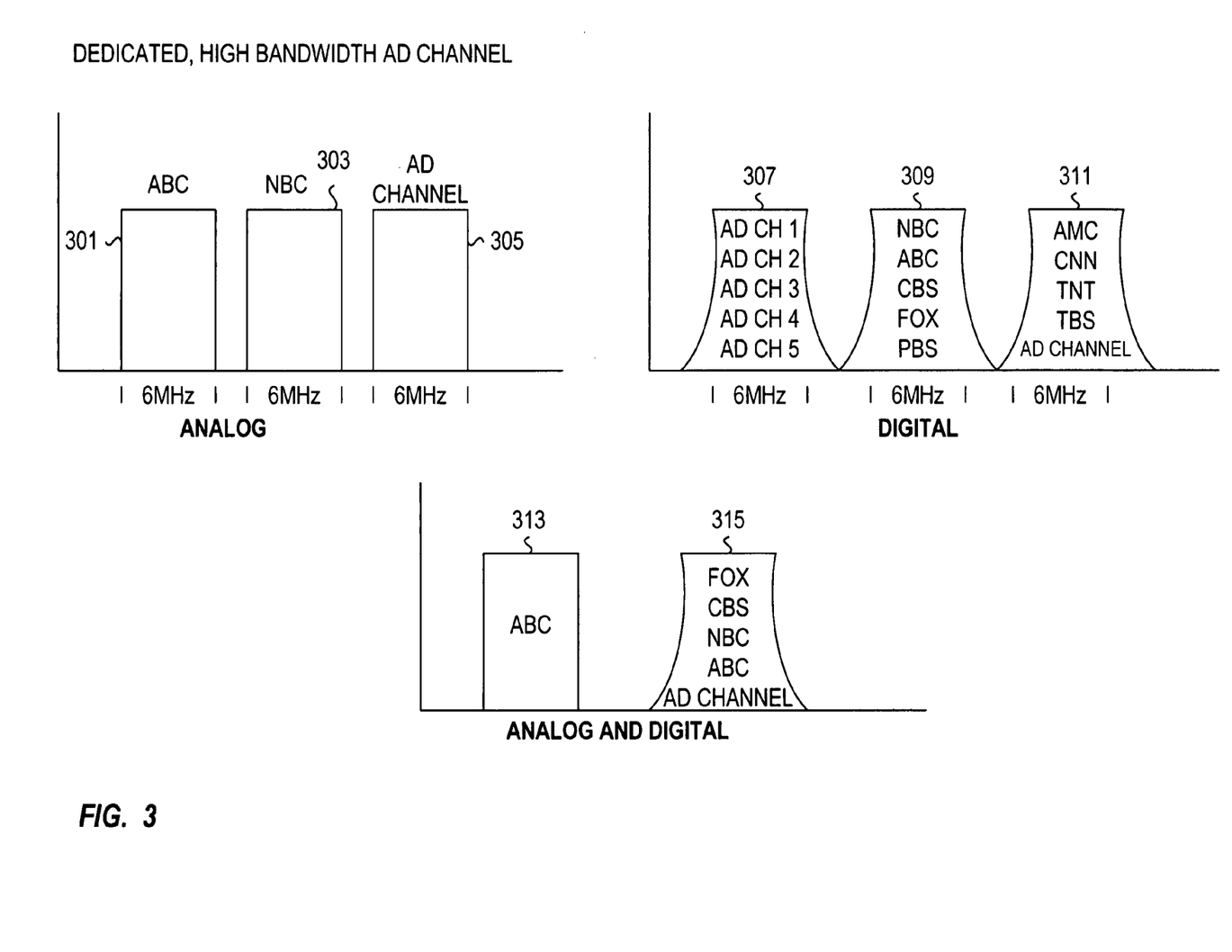
FIG. 3 illustrates several examples of how a high bandwidth ad channel could be transmitted, digitally or in analog form.

FIG. 3 shows several ways how a high bandwidth ad channel could be transmitted, digitally or in analog form. As shown in FIG. 3, a conventional analog dedicated 6 MHz channel 305 may be used to carry advertisements. Generally, the ad channel in this instance is a 6 MHz digital channel transmitted along with the programming, e.g., ABC (301), NBC (303).

One or more ad channels may be carried within a 6 MHz digital channel. FIG. 3 shows a contiguous sequence of five advertisement channels within a dedicated digital ad channel 307. The digital ad channel 307 may be transmitted along with a digital programming channel 309. Furthermore, multiple digital ad channels may be carried within one 6 MHz digital channel and carried along with the programming (311).

Alternatively, a mixture of analog and digital may be chosen, e.g., an analog channel may be used to carry programming 313, and a digital channel 315 carries the programming as well as the ad channel.

Figure 4A:
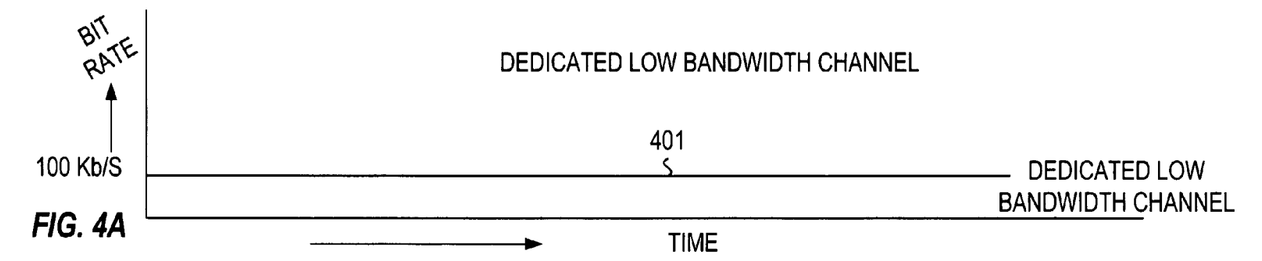
FIGS. 4A–4C illustrate ad channels being sent on low-moderate bandwidth channels, both at constant bit rates and variable bit rates.
Figure 4B:
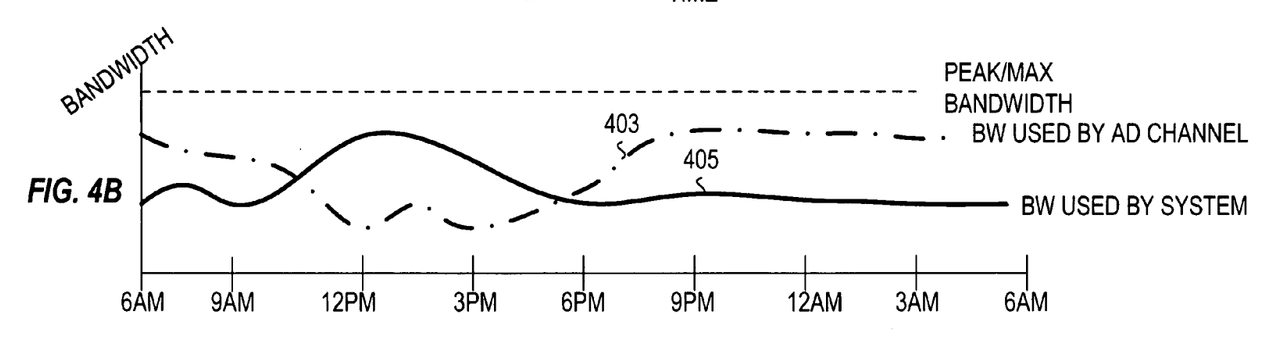
Figure 4C:
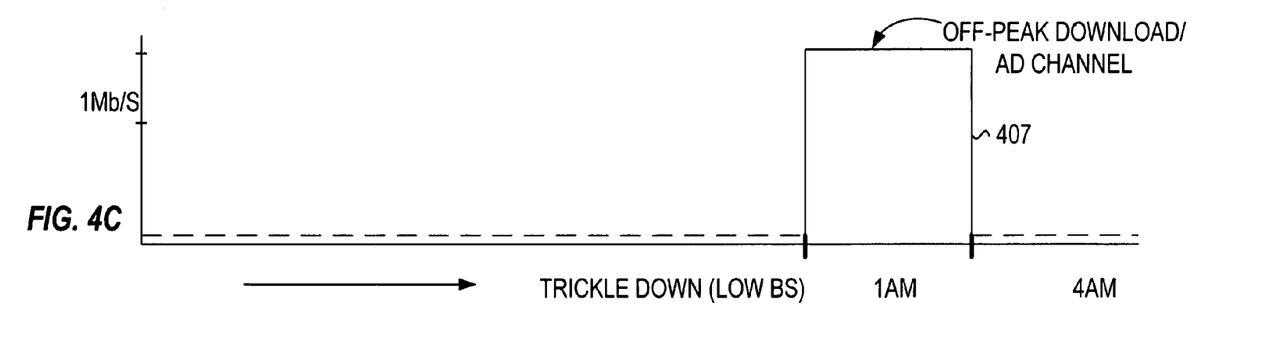

Ads can also be delivered to the STB via low and medium bandwidth channels as well and in a variety of formats (e.g., streaming media, MPEG-2, etc.) and protocols (ATM, IP, etc.) as will be evident to those skilled in the art. FIGS. 4A–4C illustrate ad channels being sent on low-moderate bandwidth channels, both at constant bit rates and variable bit rates. An example as shown in FIG. 4A, of such low bandwidth channels would be a dedicated channel 401 in which the advertisements are continually sent but at a low bit rate, and ultimately stored as a complete advertisement file on the STB. In FIG. 4A, the time is shown at the X axis, and the bit rate is shown on the Y axis.

Another approach is the "trickle down" approach that allows ad delivery to the STB without requiring a dedicated high bandwidth ad channel, such a high bandwidth channel being available for other services (e.g., network programming).

In this scenario, network bandwidth demand (or bandwidth demand by one or more individual subscribers) is monitored in real-time or statistically predicted. As shown in FIG. 4B, the ad channel is delivered at a varying bit rate following the bandwidth demands of the system. For example, as bandwidth demanded by the system channel increases, the bandwidth allocated for transmitting the ad channel would proportionally reduce. Similarly, when the bandwidth demand for the system channel decreases, the available bandwidth for carrying the ad channel is increased. FIG. 4B illustrates a varying bandwidth ad channel 403 which is shown to fluctuate. Generally, ad channel 403 varies based on the bandwidth used by the system channel 405. If the system channel (carrying programming and default advertisements) consumes more bandwidth, the bandwidth available to the ad channel is reduced. The sum of the ad channel bandwidth and the system channel bandwidth cannot exceed the maximum available. Such variable bit rate transmission schemes are well known to those skilled in the art.

Alternatively, advertisements could be delivered at "off-peak" times (i.e., when the overall demand for bandwidth is comparatively low). Bandwidth usage can be monitored and statistically predicted, either for the entire network, a sub-portion of the network, or an individual subscriber. By anticipating or predicting a period of decreased bandwidth demand (either network-wide or individually), the advertisement delivery would coincide with such decreased demand. Such a scenario would allow operators to conserve bandwidth during "peak" times for other services. In off-peak download, the ad channel can operate at comparatively high bandwidth. FIG. 4C illustrates an off-peak download ad channel 407. It is to be noted that the off-peak download ad channel can be a medium to high bandwidth channel.

The methods described above are applicable to a variety of platforms including, but not limited to, MMDS, LMDS, DBS, digital and analog hybrid fiber coax (HFC) cable TV, and SDV.

Common to all these architectures are at least one forward channel and one return channel. The forward channel is used to deliver, among other things, the ads, metadata about the ads, and instructions regarding the ads. The forward channel can be high, moderate, or low bandwidth as described further above. The return path/channel is used for, among other things, communicating to the service provider various aspects regarding which ads are stored, timing and quantity of which ads have been played, which ads are scheduled for play, etc. Such information is critical to the "traffic and billing" (T&B) systems of the service provider. The return path, responsible for transmitting data, would typically be a low bandwidth channel.

Thus, the ad channel could be transported to a STB according to different broadband services and delivery platforms. In a preferred embodiment, the ad channel is a high bandwidth channel suitable for delivering acceptable quality video. However, the ad channel could be low or moderate bandwidth. Moreover, the ad channel could be intermittent. For example, the ad channel could be transmitted only during certain periods of low bandwidth demand (i.e., off-peak); or the ad channel could be sent in a "bursty" manner, that is, the ad channel would be transmitted at a varying bit rate depending on the instantaneous bandwidth demands of the system on which it is carried.

It is to be understood that each of the systems may generate their own ad channel (e.g., at the HE or CO or DBS uplink) or that each of these systems may receive one or more different ad channels. In the cases that any of these systems generate their own ad channel, ads would be delivered to the provider from the advertisers (or other party), stored on a local ad server, and used to create one or more ad channels to be sent to the STBs. In this scenario, ads could be delivered to the providers in many ways, including those mentioned, but also including storage media (e.g., a DVD sent via Federal Express). Generally, the HE/CO receives, stores, and processes subscriber profiling information, and receives and stores ads and associated metadata. The subscriber grouping server and ad grouping server forms groups of subscribers (or assigns a node or cell to a group) and groups of ads respectively. Appropriate ad channels (matching ad groups to subscriber groups) are formed and sent to the STB. Input is also received from Traffic and Billing databases regarding which ads to send where and which metadata/instructions to send with each ad or channel. STB records are sent upstream to the T&B, and STB click stream data can also be sent for profiling purposes.

In the case of the DBS platform, one embodiment is that of the ad channel being uplinked to the DBS provider satellite which then downlinks the ad channel to the subscriber STB. The subscriber has a satellite dish and a receiver for decoding the transmission. The return path in the DBS case is typically the conventional telephone line (POTs) which runs from the subscriber's home or business back to the DBS provider's central office (or other processing facility). The ad channel is transmitted via satellite to the STB. Metadata and instructions regarding the ad channel and ads can also be transmitted by the satellite, embedded in the ad channel or separate from it. However, these data can also be sent over the telephone line (i.e., forward path). A trickle down forward channel to deliver the ads to the STB could also be performed via the twisted wire pair using the "POTS" (Plain Old Telephone System) line. Data from the STB is transmitted to the DBS provider on the telephone return path.

In an alternate and preferred embodiment, the system is a hybrid DBS/DSL system. The STB supports both DBS signal reception as well as DSL functionality. The DSL service would for example be provided over twisted wire pair to the home. In this embodiment conventional TV programming is received via the DBS signal, whereas other services are sent downstream to the STB via the DSL channel. Such other services may include a high, moderate, and low bandwidth ad channel delivered to the STB for storage and display. Metadata and other instructions regarding the ads (e.g. storage, scheduling, grouping, etc.) could also be provided via the DSL channel. The DSL channel could also be used as the return path for, inter alia, sending anonymous transaction profiles and ad scheduling/transactions (e.g., display) information. Such DBS/DSL systems would also allow for enhanced services where high-bandwidth uploads/requests are required such as Interactive TV.

In the case of the hybrid fiber-coax (HFC) cable system, a Head End (HE) receives the ad channel either via a satellite downlink (e.g., HITs) or land based connection (e.g., Internet/WAN or LAN). In one embodiment, this ad channel is then sent to the STB via the HFC plant on a high bandwidth video channel. The HFC plant comprises, for each node, a fiber from the HE to the node which comprises an O/E transducer transmitting onto coax feeder cables, and then drops to the CPE STB. In another embodiment, the ad channel is sent over a DOCSIS channel. Metadata, instructions, and other data associated with the ad can be sent over these channels (embedded with the ad or separate) or over other channels (e.g., low bandwidth). The conventional return path (e.g., <50 MHz) can be used by the STB to send data re the ads (as described above). A POTS line could also be used in the event two-way cable service is not realized or desired. As described further herein, a HE could generate its own ad channels. In this scenario, the HE would be able to direct different ad channels to one or more of its cable nodes (O/E). This would prove advantageous, in that one or more ad channels corresponding to one or more specific target groups (nodes) could be created and sent to their appropriate node(s). Each STB serviced by that node would receive and store all ads on its ad channel, and thus would not need to filter the ads since each ad received on the ad channel would be appropriate for that STB. The HE would typically have its own ad server with which to generate the ad channels, but could also do the filtering of incoming ad channel(s) creating separate ad channels (e.g., for each node) "on-the-fly."

In the case of the SDV platform, the Central Office (CO) receives the ad channel either via a satellite downlink (e.g., HITs) or land based connection (e.g., Internet/WAN or LAN). The ad channel would either be received by the CO as ATM, or the CO would ATM encode the ad channel prior to distribution to the STB. The ad channel would be transported to the STB using the ATM protocol. In one embodiment, the ad channel is sent to the STBs via a fiber-to-the-curb (FTTC), fiber-to-the-building (FTTB) or fiber-to-the-neighborhood (FTTN) network, which terminates at an Optical Network Unit (BNU) with an O/E converter, and from the BNU over twisted wire pair (twp) drops to each home or business STB. The metadata and instructions would be sent either embedded in the ad or separate from it with the appropriate associating links. The return path for communication by the STB to the CO could be over the same plant on a low bandwidth return channel. Another embodiment of SDV is that of VDSL (very high speed DSL). In this system, fiber runs from the CO broadband digital terminal (BDT) to one or more universal service access multiplexers (USAM) and then from the USAM to one or more residences over conventional twisted wire pair telephone wire.

As described further herein, a CO implementing the SDV platform could generate its own ad channels. In one scenario, because the ATM switching occurs at the CO, the CO would be able to direct different ad channels (i.e., on different VPI/VCIs) to one or more of its subscribers STB. This would prove advantageous, in that one or more ad channels corresponding to one or more specific target groups (subscribers or groups of subscribers) could be created and sent to the appropriate subscriber or group of subscribers. Each STB instructed to tune to a particular ad channel (VPI/VCI) would receive and store all ads on its ad channel, and thus would not need to filter the ads since each ad received on the ad channel would be appropriate for that STB. The CO would typically have its own ad server with which to generate the ad channels, but could also do the filtering of incoming ad channel(s) creating separate ad channels (VPI/VCIs) "on-the-fly." In both described SDV embodiments, the ad channel (or individual ads themselves) could be sent over low or moderate bandwidth channels, or in an intermittent manner (e.g., on bursty channel or during off-peak times).

In the case of Local Multipoint Distribution Service LMDS (or MMDS), the LMDS Head End or Central Office receives the ad channel from an ad channel source, or alternatively, generates one or more of its own ad channels. In either case, and in one embodiment, this ad channel is then sent to the STB by transmitting it to the local LMDS Cell (i.e., the local LMDS broadcast tower). The LMDS transmitter tower sends the channel to STBs within the local "cell" (typically 500–2000 residences). This is a wireless transmission using either QPSK or QAM modulation. The channel is received at the residence or business via a small dish antenna, and is decrypted and decoded by a receiver. Metadata, instructions, and other data associated with the ad can be sent, embedded with the ad or separate and/or over other channels (e.g., low bandwidth). The return path for LMDS would be over the same wireless path using a Media Access Control (MAC) protocol. A POTS line could also be used as a return path in the event two-way service is not realized or desired (e.g., MMDS).

As described further herein, a LMDS HE could generate its own ad channels. In this scenario, the HE would be able to direct different (i.e., customized) ad channels to one or more of its broadcast towers. This would prove advantageous, in that one or more ad channels corresponding to one or more specific target groups (broadcast cells) could be created and sent to their appropriate cell(s). Each STB serviced by that cell would receive and store all ads on its ad channel, and thus would not need to filter the ads since each ad received on the ad channel would be appropriate for that STB. The HE would typically have its own ad server with which to generate the ad channels, but could also do the filtering of incoming ad channel(s) creating separate ad channels (e.g., for each cell) "on-the-fly." A Hybrid LMDS/DSL system could also be used to deliver the ad channels (see above under DBS/DSL).

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of delivering advertisements to subscribers in a television or video network environment having a transmission medium, a display device and a storage medium, the method comprising:
   (a) transmitting program content to the subscribers over the transmission medium at a program content transmission bit rate;
   (b) displaying the program content to the subscribers on the display device;
   (c) transmitting advertisements to the subscribers over the transmission medium at an advertisement transmission bit rate, wherein the advertisements are transmitted in advance of being presented to the subscribers and are transmitted simultaneous with the transmission and display of the program content;
   (d) storing the advertisements in the storage medium; and
   (e) varying the advertisement transmission bit rate such that the transmission of the advertisements does not substantially reduce the program content transmission bit rate.

2. The method of claim 1 wherein step (e) includes determining an available bandwidth of the transmission medium prior to varying the advertisement transmission bit rate.

3. The method of claim 1 wherein step (e) includes monitoring the program content transmission bit rate to determine an available bandwidth of the transmission medium.

4. The method of claim 1 wherein step (e) includes predicting the program content transmission bit rate to determine an available bandwidth of the transmission medium.

5. The method of claim 4 wherein the program content transmission bit rate is statistically predicted.

6. The method of claim 1 wherein varying the advertisement transmission bit rate occurs in real time.

7. The method of claim 1 wherein the advertisement transmission bit rate is varied in accordance with the program content transmission bit rate.

8. The method of claim 1 wherein the program content is displayed on the display device in real-time.

9. The method of claim 1 wherein the transmitted advertisements are targeted to the subscribers.

10. The method of claim 1 further comprising:
   (f) selecting advertisements to be transmitted to the subscribers.

11. A method of delivering advertisements to subscribers in a television or video network environment having a transmission medium, a display device and a storage medium, the method comprising:
   (a) transmitting program content to the subscribers over the transmission medium at a program content transmission bit rate;
   (b) displaying the program content to the subscribers on the display device;
   (c) transmitting advertisements to the subscribers over the transmission medium at an advertisement transmission bit rate, wherein the advertisements are transmitted in advance of being presented to the subscribers and are transmitted simultaneous with the transmission and display of the program content;
   (d) storing the advertisements in the storage medium; and
   (e) varying the advertisement transmission bit rate such that the transmission of the advertisements does not exceed the maximum bandwidth of the transmission medium.

12. The method of claim 11 wherein step (e) includes determining an available bandwidth of the transmission medium prior to varying the advertisement transmission bit rate.

13. The method of claim 11 wherein step (e) includes monitoring the program content transmission bit rate to determine an available bandwidth of the transmission medium.

14. The method of claim 11 wherein step (e) includes predicting the program content transmission bit rate to determine an available bandwidth of the transmission medium.

15. The method of claim 14 wherein the program content transmission bit rate is statistically predicted.

16. The method of claim 11 wherein varying the advertisement transmission bit rate occurs in real time.

17. The method of claim 11 wherein the advertisement transmission bit rate is varied in accordance with the program content transmission bit rate.

18. The method of claim 11 wherein the program content is displayed on the display device in real-time.

19. The method of claim 11 wherein the transmitted advertisements are targeted to the subscribers.

20. The method of claim 11 further comprising:
   (f) selecting advertisements to be transmitted to the subscribers.

* * * * *